United States Patent [19]

Forsyth et al.

[11] Patent Number: 4,989,703
[45] Date of Patent: Feb. 5, 1991

[54] HYDRAULIC BRAKE RELEASE SYSTEM

[75] Inventors: Allen P. Forsyth, Portland; William E. Armstrong, Corbett, both of Oreg.

[73] Assignee: Atlas Copco Construction and Mining Holding AB, Stockholm, Sweden

[21] Appl. No.: 269,627

[22] Filed: Nov. 10, 1988

[51] Int. Cl.$^5$ .............................................. B60K 41/26
[52] U.S. Cl. ...................................... 192/4 A; 192/7; 188/151 A
[58] Field of Search ...................... 192/4 A, 7, 4 R; 188/151 A

[56] References Cited

U.S. PATENT DOCUMENTS

| | | | |
|---|---|---|---|
| 2,948,359 | 8/1960 | Barrett | 188/106 |
| 3,132,724 | 5/1964 | Ansteth | 188/73 |
| 3,680,666 | 8/1972 | Sommer | 188/170 |
| 3,905,651 | 9/1975 | Hornung | 303/2 |
| 3,927,737 | 12/1975 | Prillinger et al. | 188/106 |
| 3,941,219 | 3/1976 | Myers | 188/170 |
| 3,946,837 | 3/1976 | Houser | 188/72.4 |
| 4,006,939 | 2/1977 | Schexnayder | 303/71 |
| 4,077,500 | 3/1978 | Hickman, Sr. et al. | 188/106 |
| 4,181,368 | 1/1980 | Strom | 303/15 |
| 4,227,598 | 10/1980 | Luft | 192/4 A |
| 4,274,680 | 6/1981 | Sieving et al. | 303/6 A |
| 4,355,698 | 10/1982 | Barnes et al. | 192/4 A |
| 4,358,000 | 11/1982 | Cumming | 188/71.5 |
| 4,415,067 | 11/1983 | Cory | 188/71.5 |
| 4,483,422 | 11/1984 | Cory | 188/71.5 |
| 4,811,811 | 3/1989 | Bergene | 192/4 A |

FOREIGN PATENT DOCUMENTS 1495915 12/1977 United Kingdom .

OTHER PUBLICATIONS

Schematic diagram entitled, "Split Service Brake System with High Pressure Drive Line Brake", (undated).

Primary Examiner—Rodney H. Bonck
Assistant Examiner—Andrea Pitts
Attorney, Agent, or Firm—Klarquist, Sparkman, Campbell, Leigh & Whinston

[57] ABSTRACT

An all-hydraulic brake release system is disclosed for use on a vehicle having a transmission fluid pressure source, a brake fluid pressure source and a spring-applied, fluid pressure-released vehicle brake. The system has a control valve block which is hydraulically connected to the transmission fluid pressure source, the brake fluid pressure source and the brake. A first, transmission clutch pressure-responsive valve in the block controls the fluid connection between the brake fluid pressure source and the vehicle brake. A second, brake fluid pressure-responsive valve in the block controls the communication of brake fluid pressure to a pilot end of the first valve. If either brake fluid pressure or transmission clutch pressure falls below respective predetermined values, the first valve closes to cut off the supply of brake fluid pressure to the brake such that the brake is applied to stop vehicle movement.

21 Claims, 2 Drawing Sheets

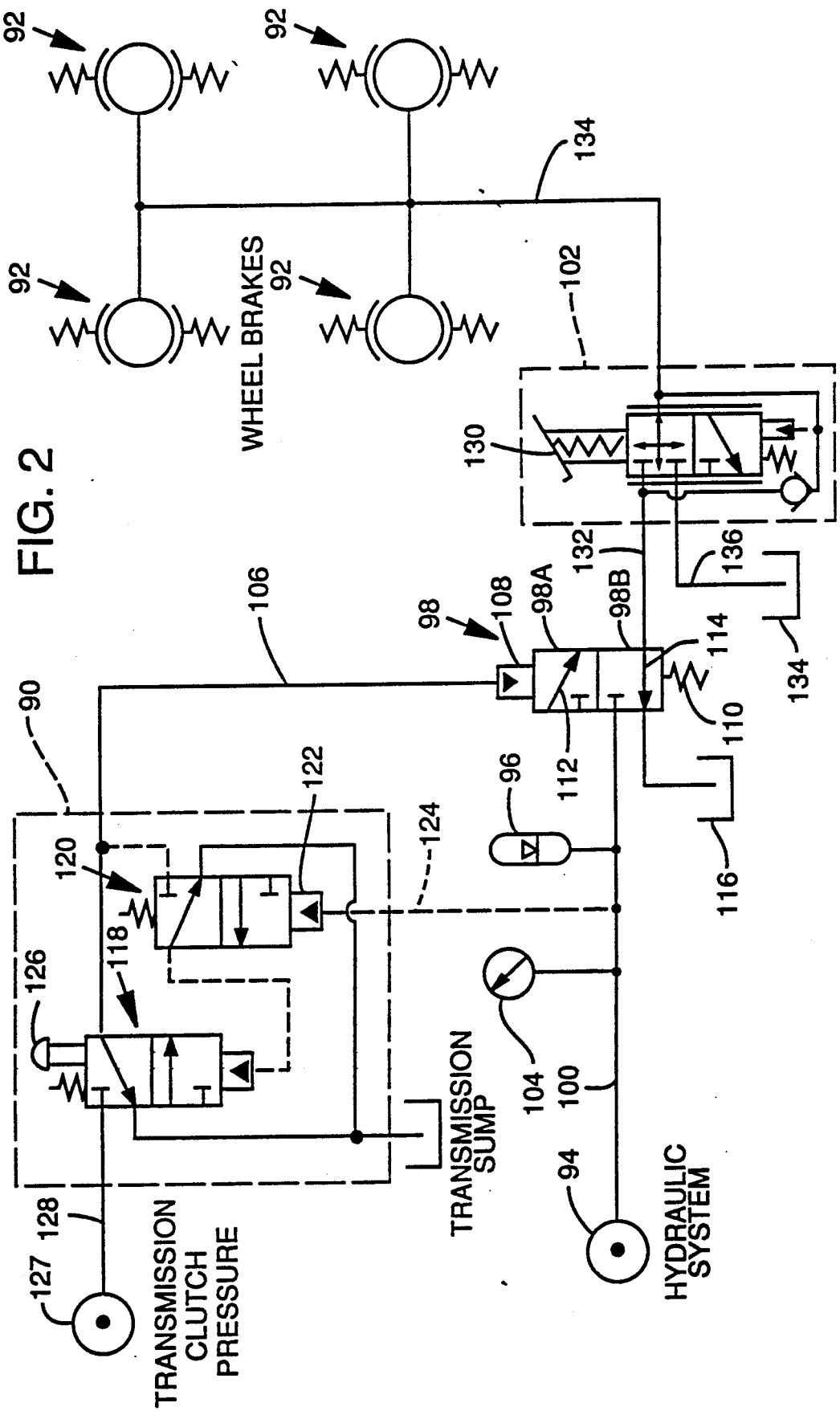

HYDRAULIC BRAKE RELEASE SYSTEM

BACKGROUND OF THE INVENTION

The present invention relates to a brake release system and in particular, an all-hydraulic brake release system for use with heavy-duty vehicles having spring-activated, fluid pressure-released vehicle brakes.

Most engine-powered land vehicles have both a service braking system and a secondary braking system. The service braking system is designed for variable application during the vehicle's operation to control its speed and stop the vehicle when necessary. A separate and independent secondary or parking brake system is designed for stopping vehicle movement when the service braking system becomes disabled or when engine power is shut off.

In large heavy-duty materials handling vehicles, such as those used in construction and underground mining operations, spring-activated, fluid pressure-released secondary or parking braking systems are commonly used. One type of such a braking system is a driveline brake in which friction braking elements are spring-applied to the driveline and released by hydraulic brake fluid pressure tapped from the vehicle's hydraulic system. Thus, when hydraulic fluid pressure becomes unavailable to operate the vehicle's service brake system, either through failure of the service brake system or loss of engine power, the driveline brake is automatically spring-applied as a secondary or parking brake to stop the vehicle. Such a system, for example, has been used by Wagner Mining Equipment Co., of Portland, Ore., a division of PACCAR, Inc., for many years in its underground mining vehicles.

The application of the driveline brake is typically controlled by an electrical solenoid-operated control valve. However, electrical components such as these are subject to failure when used in corrosive atmospheres, such as commonly encountered in underground mining operations. In addition, the safety features provided by an electrically-controlled driveline brake can be easily deactivated or bypassed by the vehicle user, which is undesirable.

From the foregoing it will be apparent that there is a need for an all-hydraulic brake release system for use on heavy-duty vehicles. Therefore it is a primary object of the present invention to provide an all-hydraulic brake release system for use on vehicles having a spring-applied, fluid pressure-released brake.

It is a further object of the present invention to provide a brake release system which will only release the brake under normal vehicle hydraulic fluid operating pressures and which will automatically reapply the brake upon loss of normal vehicle hydraulic fluid operating pressure.

It is a further object to provide a brake release system which will reapply the brake upon loss of either brake fluid pressure or transmission clutch fluid pressure.

It is a further object of the present invention to provide a brake release system which is highly reliable, even in corrosive environments, such as found in underground mining operations.

It is a further object to provide a brake release system which has safety features which cannot be easily defeated by a vehicle operator.

SUMMARY OF THE INVENTION

The present invention is an all-hydraulic brake release system for use on heavy-duty vehicles with spring-applied, fluid pressure-released brake systems. In a preferred embodiment, the system is used on a vehicle having a transmission fluid pressure source, a brake fluid pressure source and a spring-applied, fluid pressure-released vehicle braking means. The brake fluid pressure source may be the vehicle's transmission, conventional brake system or other hydraulic system. The system comprises a valve means which is hydraulically connected to a transmission fluid pressure source, a brake fluid pressure source and the brake means. The valve means is operable to communicate brake fluid under brake-release pressure to the braking means in response to normal vehicle transmission pressures. Fluid pressure sufficient to release the braking means is communicated to the braking means only when the transmission fluid pressure is above a predetermined level. If either transmission fluid pressure or brake fluid pressure falls below respective predetermined levels, the control valve cuts off the supply of brake fluid and thus brake fluid pressure to the braking means and exhausts the pressure cavity of the braking means so that the braking means is spring-engaged to stop movement of the vehicle. The system may also be configured so that the vehicle operator must initially manipulate the valve manually to communicate the brake fluid to the braking means.

BRIEF DESCRIPTION OF THE DRAWINGS

FIG. 2 is a schematic diagram of a service brake system with a plurality of spring-applied, fluid pressure-released wheel brakes incorporating the all-hydraulic brake release system in accordance with the present invention.

DETAILED DESCRIPTION OF THE PREFERRED EMBODIMENTS

FIG. 1 Embodiment

Figure 1:
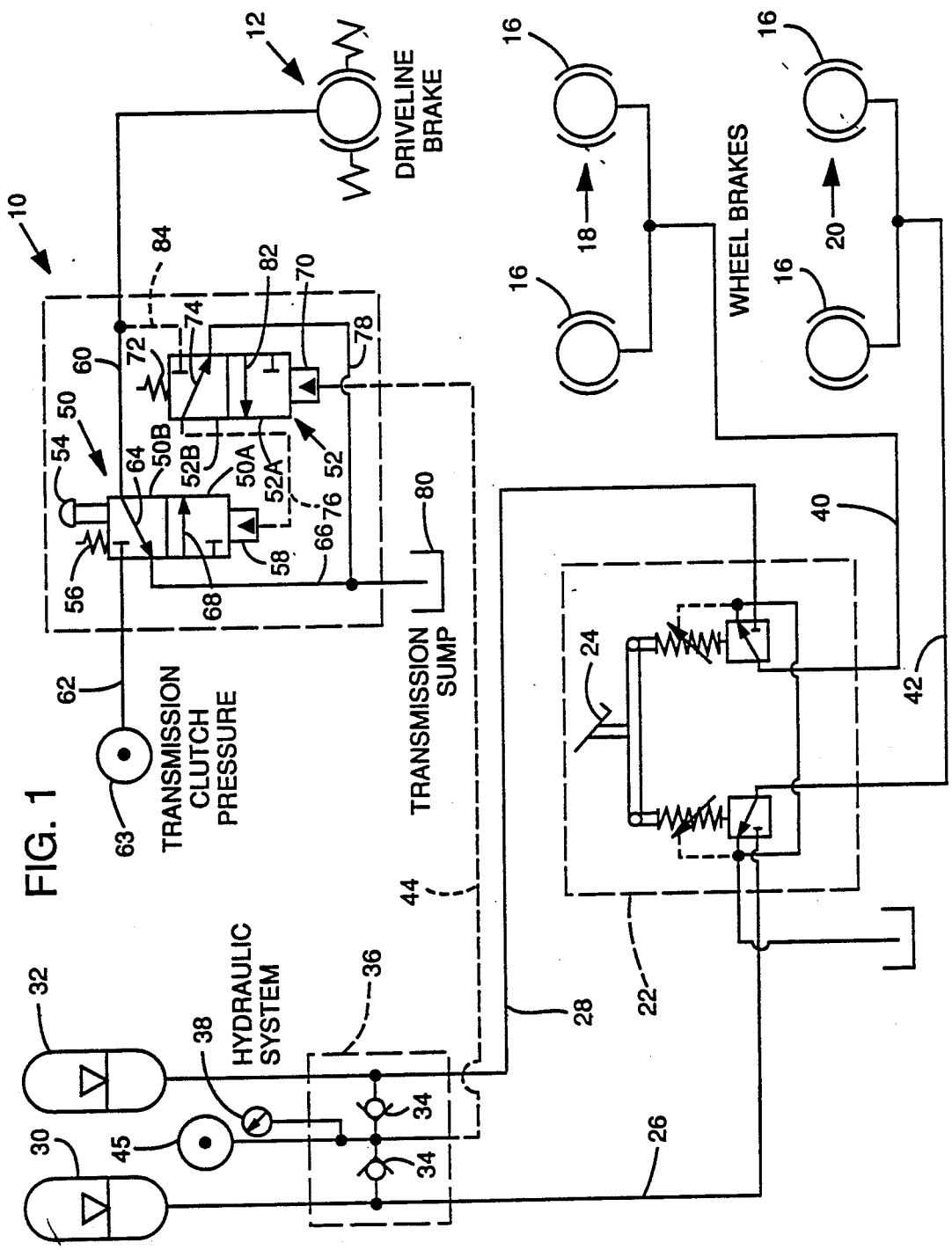
FIG. 1 is a schematic diagram of a hydraulic brake system with a spring-applied, fluid pressure-released driveline brake incorporating an all-hydraulic brake release system in accordance with the present invention.

Referring to FIG. 1, an all-hydraulic brake release system includes a control valve block 10 which controls the communication of brake fluid pressure from a brake fluid pressure source to a driveline brake 12. The brake fluid pressure source may be the vehicle's transmission, service braking system or other hydraulic system. The driveline brake 12 may be a conventional spring-applied, fluid pressure-released brake, which indicates that in the absence of sufficient brake fluid pressure to overcome the action of springs in the brake, the brake is applied to the driveline of the vehicle to stop vehicle movement. To move the vehicle, the driveline brake 12 must be released by supplying sufficient brake fluid pressure to the brake to overcome the action of the springs.

A service brake system is provided to control service brakes 16 on the vehicle's front axle 18 and rear axle 20. As shown in FIG. 1, a conventional service brake valve block 22 actuated by a foot pedal 24 provides brake fluid to the brakes 16 under variable pressure proportional to the amount of force exerted on the foot pedal 24 by the vehicle operator. Conduits 26 and 28 hydraulically connect a brake fluid pressure source, such as a rear accumulator 30 and a front accumulator 32, respectively, to the brake valve block 22. Check valves 34 in manifold 36 isolate the front and rear accumulators 30 and 32 and their respective circuits. A pressure gauge 38 is connected to the manifold 36 to indicate fluid pressure in the hydraulic system.

Conduits 40 and 42 hydraulically connect the brake valve block 22 to the front axle 18 and the rear axle 20, respectively, for communicating brake fluid through the brake valve block for operating the wheel brakes 16. The wheel brakes 16 may be either applied by brake fluid pressure, or released by brake fluid pressure when spring-applied brakes are used, such as will be discussed below.

In the system of FIG. 1, control valve block 10 controls communication of driveline brake fluid pressure from the transmission clutch of the vehicle to the spring-applied, pressure-released driveline brake 12. The control valve block 10 is also hydraulically connected by pilot line 44 to the accumulator manifold 36 and is responsive to pressure in the accumulator circuit, as will be discussed below. Generally, and by way of example, under normal operating conditions, the transmission clutch fluid pressure acting on the control valve 10 will be about 200 psi, and the accumulator pressure will be about 1400-1900 psi.

Control valve block 10 contains a primary manually operable two-position control valve 50 and a secondary two-position control valve 52. These two valves are arranged such that the primary control valve 50 communicates transmission fluid pressure from the transmission to the driveline brake 12 to release the brake only when the transmission pressure is maintained above a first predetermined minimum value, such as 60 psi, and the accumulator pressure is maintained above a second predetermined value, such as 1400 psi.

The primary control valve 50 is manually movable by a suitable control knob 54 between a selected open position 50A and a closed position 50B shown. The valve 50 is biased to its closed position by a spring 56 and shifts to such position in the absence of sufficient transmission clutch pressure acting on its opposite end at 58. A brake supply conduit 60 connects one side of the primary valve 50 to the driveline brake 12. Transmission clutch fluid supply passage 62 connects the transmission fluid pressure source 63 to the other side of the primary valve 50. Valve passage 64 connects driveline brake supply passage 60 to drain passage 66 when the primary valve 50 is in its closed position 50B. Valve passage 68 connects transmission fluid supply passage 62 to brake supply conduit 60 to pressurize the brake 12 to release it when the primary valve 50 is in its open position 50A. The primary valve 50 must be manually shifted via knob 54 to its open position 50A, but will be held in such position so long as there is sufficient transmission clutch fluid pressure acting on its opposite end at 58.

Secondary control valve 52 is hydraulically operable in response to changes in hydraulic system pressure. It includes an open position 52A and a closed position 52B. Pilot line 44 communicates hydraulic system pressure from its source 45 to end 70 of valve 52. A spring 72 acts against the opposite end to bias valve 52 to its closed position 52B shown. When valve 52 is in the closed position, valve passage 74 connects pilot passage 76 from the pilot end 58 of valve 50 to drain line 78 leading to sump 80. In the open position of valve 52, valve passage 82 connects fluid passage 84 from driveline brake fluid supply conduit 60 to pilot passage 76 leading to the pilot end 58 of primary valve 50 to render valve 50 responsive to fluid pressure and condition it for movement to and maintenance in its open position 50A.

From the foregoing it will be apparent that when accumulator pressure driveline is above a predetermined minimum, say 1400 psi, valve 52 is shifted to its open position, connecting pilot end 58 of valve 50 to driveline brake fluid supply line 60. If the transmission fluid is at a normal operating pressure, say 200 psi or above, and valve 50 is shifted manually to its open position 50A, fluid pressure acting at pilot 58 holds valve 50 in its open position, transmitting fluid pressure from the transmission through line 60 to release brake 12.

When driveline brake 12 is released, either of two condition changes will cause valve 50 to shift to its closed position to relieve brake 12 of fluid pressure and thereby reapply such brake. Either a drop in transmission clutch pressure or a drop in hydraulic system pressure below their respective threshold levels will reapply brake 12.

A drop in transmission clutch pressure is sensed at pilot end 58 of valve 50, and if the drop is below its threshold level, spring 56 returns valve 50 to its closed position 50B. A drop in hydraulic system pressure is sensed at pilot end 70 of valve 52, and if the drop is below its threshold level, spring 72 shifts valve 52 to its closed position 52B. In its closed position, valve 52 drains fluid from line 76 through valve passage 74 and drain line 78 to sump 80, thus relieving fluid pressure at pilot end 58 of valve 50. Valve 50 thus shifts under the influence of spring 56 to its closed position 50B, relieving brake fluid pressure at brake 12, allowing the brake springs to apply the brake to the driveline.

FIG. 1 Operational Example

In a typical operational sequence, such as where the vehicle is being started up in the morning, driveline brake 12 in engaged due to lack of sufficient fluid pressure to overcome the force of the brake springs. When the vehicle operator starts the vehicle, fluid pressure of between 1400 and 1900 psi builds up in the accumulator. In addition, transmission clutch pressure builds up to its normal operating pressure, which is approximately 200 psi. Upon reaching normal accumulator pressure, the pressure in pilot line 44 moves secondary valve 52 to its operating position 52A wherein fluid pressure from the transmission may be communicated through pilot line 76 to the primary valve. As a safety feature, the pressure in pilot line 76 does not automatically move primary valve 50 to its open position 50A to release driveline brake 12.

After the transmission fluid reaches a normal operating pressure, the operator must manually shift primary valve 50 to its open position 50A using control knob 54 to allow the transmission clutch pressure to be communicated through conduit 60 as brake fluid pressure to the brake 12. Transmission clutch pressure is also communicated through conduit 84 and through secondary valve 52 to pilot end 58 of primary valve 50. Pressure in pilot end 58 then retains primary valve 50 in its open position 50A so that the driveline brake 12 remains disengaged from the driveline. Service braking is provided through service brake block 22 in a conventional manner.

Control valve block 10 maintains fluid pressure to keep driveline brake 12 in its disengaged position so that the vehicle can be moved unless either one of two conditions occurs. The first condition is an absence or loss of pressure in accumulator manifold 36, which prevents communication of fluid pressure to the pilot end 70 of secondary valve 52. In this condition, spring 72 returns secondary valve 52 to its nonoperating, closed position 52B. This cuts off fluid pressure to pilot end 58 of primary valve 50, causing spring 56 to return the primary valve 50 to its closed position 50B. In such position fluid pressure can no longer be applied through conduit 60 to driveline brake 12, causing its springs to apply such brake. When proper hydraulic system pressure is reestablished, the vehicle operator must again manually operate control knob 54 to release driveline brake 12 and resume normal vehicle operation.

The second condition that will reapply driveline brake 12 is a loss of clutch pressure. When transmission clutch pressure falls below a predetermined normal operating value, the pressure communicated through conduits 60 and 84 and secondary valve 52 to pilot line 58 of primary valve 50 decreases, enabling spring 56 to return primary valve 50 to its closed position 50B, reapplying driveline brake 12.

FIG. 2 Embodiment

The brake system of FIG. 2 utilizes a plurality of spring-applied, fluid pressure-released wheel brakes incorporating the brake release system of the present invention. It includes a control valve block 90 which controls the communication of brake fluid pressure from the vehicle's hydraulic system to spring-applied, fluid pressure-released wheel brakes 92. Such brakes are described in copending U.S. patent application Ser. No. 155,204, filed Feb. 12, 1988, entitled "Fail-Safe Wheel Service Brake System" and assigned to the present assignee, the disclosure of which is incorporated by reference herein.

Brake fluid pressure is developed in a hydraulic system represented by a source of hydraulic system fluid pressure 94 in a conventional manner and stored in an accumulator 96. Accumulator 96 is connected to a brake control valve 98 via conduit 100 to control the application of brake fluid pressure to foot-controlled brake valve 102 in response to transmission clutch pressure and brake fluid pressure. A pressure gauge 104 is connected to conduit 100 to indicate fluid pressure.

Brake control valve 98 has an open position 98A and a closed position 98B. Valve 98 is moved to its open position 98A by transmission clutch pressure acting through control valve block 90 and conduit 106 at pilot end 108 of brake valve 98. Spring 110 is applied to return valve 98 to its closed position 98B in the absence of transmission clutch pressure at pilot end 108. In open position 98A, brake fluid flows through valve passage 112 to foot controlled brake valve 102. In closed position 98B, fluid is drained through valve passage 114 to sump 116.

The control valve block 90 contains a primary control valve 118 and a secondary control valve 120. Both operate in a manner similar to corresponding valves described with reference to FIG. A pilot end 122 of secondary valve 120 is hydraulically connected to brake fluid conduit 100 by pilot conduit 124 and is responsive to brake fluid pressure to operate secondary valve 120. Primary valve 118 includes a control knob 126 which is manually operable by the vehicle operator to initially supply transmission clutch pressure from a source 127 of transmission fluid pressure via conduits 128 and 106 to brake control valve 98 to release wheel brakes 92, as discussed above.

Service braking is controlled by the foot-controlled brake valve 102, actuated by a foot pedal 130. When control valve block 90 is actuated as described above, transmission clutch pressure is communicated through conduit 106 to pilot end 108 of the brake control valve 98 to shift the valve to its open position 98A. Brake fluid pressure transmitted from hydraulic system 94 through conduits 100 and 132, foot-controlled brake valve 102 and conduit 134, operates wheel brakes 92. By varying pressure on foot pedal 130, the brake fluid pressure applied to wheel brakes 92 is controlled by the vehicle operator. When the foot pedal 130 is totally depressed, brake fluid is drained to sump 134 through conduit 136, relieving brake fluid pressure and causing spring pressure to apply brakes 92 to the wheels.

In a manner similar to that described for the FIG. 1 embodiment, loss of normal operating pressure in either the transmission clutch fluid or the hydraulic system 94 causes primary valve 118 to close, cutting off transmission clutch pressure to pilot end 108 of valve 98. Valve 98 is shifted to its closed position 98B by spring 110. No fluid pressure is delivered through foot operated valve 102 and wheel brakes 92 are reapplied to the wheels.

Having illustrated and described the principles of the invention by several presently preferred embodiments, it should be apparent to those persons skilled in the art that the illustrated embodiments may be modified without departing from such principles. For example, the driveline brake 12 of FIG. 1 could be operated by a fluid pressure source other than the transmission clutch, such as the hydraulic system of the vehicle. We therefore claim as our invention not only the illustrated embodiments but all such modifications, variations and equivalents thereof as come within the spirit and scope of the following claims.

What is claimed is:

1. An all-hydraulic brake release system for a vehicle having a transmission fluid pressure source, a brake fluid pressure source and a spring-applied, fluid pressure-released vehicle braking means, the system comprising:
    conduit means connecting the transmission fluid pressure source with the braking means; and
    valve means in the conduit means for controlling communication between the transmission fluid pressure source and the braking means, wherein the valve means includes manually operable means movable between open and closed positions for opening and closing the conduit means to communication between the transmission fluid pressure source and braking means and wherein the valve means includes means responsive to transmission fluid pressure to (1) maintain the manually operable means in a selected open position when transmission fluid pressure is above a predetermined minimum pressure and (2) return the manually operable means from a selected open position to a closed position when the transmission fluid pressure is below the predetermined minimum pressure.

2. The system of claim 1 wherein the valve means includes means responsive to brake fluid pressure to maintain the manually operable means in a selected open position only when both the transmission fluid pressure and the brake fluid pressure are above predetermined minimum transmission and brake fluid pressure levels.

3. The system of claim 1 wherein the manually operable means is a first valve.

4. The system of claim 3 wherein the pressure responsive means is a second valve for controlling the position of the first valve.

5. The system of claim 4 wherein the second valve is movable between open and closed positions responsive to changes in the brake fluid pressure above and below a predetermined brake fluid pressure and is operable in an open position to direct transmission fluid pressure to a pilot end of the first valve to hold the first valve in an open position under normal brake release pressures.

6. The system of claim 1 wherein the braking means comprises a driveline brake.

7. The system of claim wherein the braking means comprises a wheel brake.

8. An all-hydraulic brake release system for a vehicle having a transmission fluid pressure source, a brake fluid pressure source and a spring-activated, fluid pressure-release brake means for stopping movement of the vehicle, the system comprising:
   valve means responsive to transmission fluid pressure and hydraulically connected to the brake fluid pressure source and the brake means, said valve means being operable to communicate brake fluid pressure from the brake fluid pressure source to the brake in response to transmission fluid pressures above a predetermined levels; said valve means comprising:
   manually operable means movable between a selected open position for communicating brake fluid pressure to the brake means and a closed position; and
   means responsive to transmission fluid pressure to (1) maintain the manually operable means in the selected open position when the transmission fluid pressure is above a predetermined level, and (2) return the manually operable means from the selected open position to the closed position when the transmission fluid pressure drops below the predetermined minimum level.

9. In a breaking system for a vehicle having a spring-applied, fluid-pressure released vehicle braking means, a source of brake fluid pressure, a source of transmission fluid pressure, and control valve means for controlling communication of brake fluid pressure from the source of brake fluid pressure to the braking means for controlling the release of the braking means, the improvement comprising:
   the control valve means including means manually operable to fluidly connect the brake fluid pressure source to the braking means, means responsive to the brake fluid pressure and operable under the brake fluid pressure when above a predetermined minimum pressure to maintain the fluid connection between the brake fluid pressure source and the braking means and operable under the brake fluid pressure when below said minimum pressure to disconnect the brake fluid pressure source from the braking means, and means responsive to transmission fluid pressure and operable under the transmission fluid pressure when below a predetermined minimum pressure to disconnect the brake fluid pressure source from the braking means.

10. In the system of claim 9, the manually operable means comprising a first control valve means, the means responsive to the brake fluid pressure comprising said first control valve means, and said means responsive to the transmission fluid pressure comprising a second control valve means operable to control the first control valve means.

11. In the system of claim 10, the second control valve means being operable under the transmission fluid pressure when below the minimum transmission pressure to isolate said first control valve means from the brake fluid pressure to cause said first valve means to disconnect the brake fluid pressure source form the braking means.

12. An all-hydraulic brake release system for a vehicle having a transmission fluid pressure source, a brake fluid pressure source and a spring-applied, fluid pressure-released vehicle braking means, the system comprising:
   conduit means connecting the brake fluid pressure source with the braking means; and
   valve means in the conduit means for controlling communication between the brake fluid pressure source and the braking means, wherein the valve means includes manually operable means movable between open and closed positions for opening and closing the conduit means to communication between the brake fluid pressure source and braking means and wherein the valve means includes means responsive to transmission pressure to (1) maintain the manually operable means in a selected open position when the transmission fluid pressure is above a predetermined minimum pressure and (2) return the manually operable means from the selected open position to a closed position when the transmission fluid pressure is below the predetermined minimum pressure.

13. The system of claim 12 wherein the valve means includes means responsive to brake fluid pressure to maintain the manually operable means in the selected open position only when both transmission fluid pressure and brake fluid pressure are above predetermined minimum transmission and brake fluid pressure levels.

14. The system of claim 12 wherein the manually operable means is a first valve.

15. The system of claim 14 wherein the pressure responsive means is a second valve for controlling the position of the first valve.

16. The system of claim 15 wherein the second valve is movable between open and closed positions responsive to changes in the brake fluid pressure above and below a predetermined brake fluid pressure and operable in the second valve's open position to transmit the brake fluid pressure to a pilot end of the first valve to hold the first valve in an open position under normal brake release pressures.

17. The system of claim 12 wherein the brake fluid pressure source is the transmission fluid pressure source.

18. An all-hydraulic brake release system for a vehicle having a first fluid pressure source, a second fluid pressure source and a spring-activated, fluid pressure-released brake means for stopping movement of the vehicle, the brake means being operable under fluid pressures above a threshold pressure from one of the first and second fluid sources for releasing the brake means, the system comprising:
   valve means responsive to fluid pressure from the first fluid pressure source and also being responsive to fluid pressure from the second fluid pressure source such that (1) a fluid pressure from the first source above a first predetermined pressure and a fluid pressure from the second source above a second predetermined pressure operates said valve means to enable communication of fluid pressures from said one source to the brake means and such that (2) either a fluid pressure from the first source below the first predetermined pressure or a fluid pressure from the second source below the second predetermined pressure operates said valve means to prevent communication of fluid pressures from said one source to the brake means thereby causing activation of said brake means to stop said vehicle.

19. The system of claim 18 wherein said first fluid pressure source is a source of transmission fluid pressure and said second fluid pressure source is a source of hydraulic system pressure.

20. The system of claim 19 wherein the one source of fluid pressure is the source of transmission fluid pressure.

21. The system of claim 19 wherein the one source of fluid pressure is the source of hydraulic system pressure.

* * * * *